United States Patent
Fowler et al.

(10) Patent No.: US 10,322,365 B2
(45) Date of Patent: Jun. 18, 2019

(54) APPARATUS AND SYSTEM FOR SWING ADSORPTION PROCESSES RELATED THERETO

(71) Applicants: Tracy A. Fowler, Magnolia, TX (US); Shwetha Ramkumar, Cypress, TX (US); Jeffrey W. Frederick, Spring Mills, PA (US); Ananda K. Nagavarapu, Houston, TX (US); Sebastian Chialvo, Spring, TX (US); Robert F. Tammera, Warrenton, VA (US); John W. Fulton, Annandale, VA (US)

(72) Inventors: Tracy A. Fowler, Magnolia, TX (US); Shwetha Ramkumar, Cypress, TX (US); Jeffrey W. Frederick, Spring Mills, PA (US); Ananda K. Nagavarapu, Houston, TX (US); Sebastian Chialvo, Spring, TX (US); Robert F. Tammera, Warrenton, VA (US); John W. Fulton, Annandale, VA (US)

(73) Assignee: ExxonMobil Upstream Reseach Company, Spring, TX (US)

( * ) Notice: Subject to any disclaimer, the term of this patent is extended or adjusted under 35 U.S.C. 154(b) by 110 days.

(21) Appl. No.: 15/284,960

(22) Filed: Oct. 4, 2016

(65) Prior Publication Data
US 2017/0113175 A1 Apr. 27, 2017

Related U.S. Application Data

(60) Provisional application No. 62/246,916, filed on Oct. 27, 2015.

(51) Int. Cl.
*B01D 53/04* (2006.01)
*B01D 53/047* (2006.01)

(52) U.S. Cl.
CPC ...... *B01D 53/0446* (2013.01); *B01D 53/0462* (2013.01); *B01D 53/0473* (2013.01);
(Continued)

(58) Field of Classification Search
CPC ............ B01D 53/0446; B01D 53/0462; B01D 53/0473; B01D 2256/245;
(Continued)

(56) References Cited

U.S. PATENT DOCUMENTS

| 1,868,138 | A | 7/1932 | Fisk |
| 3,103,425 | A | 9/1963 | Meyer ............................. 55/62 |

(Continued)

FOREIGN PATENT DOCUMENTS

| CA | 2297590 | 9/2000 |
| CA | 2237103 | 12/2001 |

(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.
(Continued)

*Primary Examiner* — Frank M Lawrence, Jr.
(74) *Attorney, Agent, or Firm* — ExxonMobil Upstream Research Company—Law Department

(57) ABSTRACT

Provided are apparatus and systems for performing a swing adsorption process. This swing adsorption process may involve passing streams through adsorbent bed units to remove contaminants, such as water, from the stream. As part of the process, the adsorbent bed unit may include additional space for the valves on the head of the adsorbent bed unit.

33 Claims, 3 Drawing Sheets

(52) U.S. Cl.
CPC .. *B01D 2256/245* (2013.01); *B01D 2257/504* (2013.01); *B01D 2257/702* (2013.01); *B01D 2257/80* (2013.01); *B01D 2259/40003* (2013.01); *B01D 2259/40086* (2013.01)

(58) Field of Classification Search
CPC ........ B01D 2257/504; B01D 2257/702; B01D 2257/80; B01D 2259/40003; B01D 2259/40086
USPC ................. 95/96, 117, 139; 96/108, 152
See application file for complete search history.

(56) References Cited

U.S. PATENT DOCUMENTS

| | | | | |
|---|---|---|---|---|
| 3,124,152 | A | 3/1964 | Payne | 137/269.5 |
| 3,142,547 | A | 7/1964 | Marsh et al. | 55/26 |
| 3,164,452 | A * | 1/1965 | Westeren | B01D 53/26 95/115 |
| 3,508,758 | A | 4/1970 | Strub | 277/15 |
| 3,602,247 | A | 8/1971 | Bunn et al. | 137/270 |
| 3,788,036 | A | 1/1974 | Lee et al. | 55/25 |
| 3,925,041 | A | 12/1975 | Patterson et al. | |
| 3,967,464 | A | 7/1976 | Cormier et al. | 62/13 |
| 4,187,092 | A | 2/1980 | Woolley | 62/48 |
| 4,261,815 | A | 4/1981 | Kelland | 209/213 |
| 4,324,565 | A | 4/1982 | Benkmann | 55/23 |
| 4,325,565 | A | 4/1982 | Winchell | 280/282 |
| 4,329,162 | A | 5/1982 | Pitcher | 55/523 |
| 4,340,398 | A | 7/1982 | Doshi et al. | 55/25 |
| 4,386,947 | A | 6/1983 | Mizuno et al. | 55/387 |
| 4,445,441 | A | 5/1984 | Tanca | 110/165 |
| 4,461,630 | A | 7/1984 | Cassidy et al. | 55/25 |
| 4,496,376 | A | 1/1985 | Hradek | 55/163 |
| 4,631,073 | A * | 12/1986 | Null | B01D 53/0446 95/1 |
| 4,705,627 | A | 11/1987 | Miwa et al. | 210/264 |
| 4,711,968 | A | 12/1987 | Oswald et al. | 568/454 |
| 4,737,170 | A | 4/1988 | Searle | 55/179 |
| 4,770,676 | A | 9/1988 | Sircar et al. | 55/26 |
| 4,783,205 | A | 11/1988 | Searle | 55/161 |
| 4,784,672 | A | 11/1988 | Sircar | 55/26 |
| 4,790,272 | A | 12/1988 | Woolenweber | 123/188 |
| 4,814,146 | A | 3/1989 | Brand et al. | 422/179 |
| 4,816,039 | A | 3/1989 | Krishnamurthy et al. | 55/26 |
| 4,877,429 | A | 10/1989 | Hunter | 55/162 |
| 4,977,745 | A | 12/1990 | Heichberger | 62/10 |
| 5,110,328 | A | 5/1992 | Yokota et al. | 55/180 |
| 5,125,934 | A | 6/1992 | Krishnamurthy et al. | 55/25 |
| 5,169,006 | A | 12/1992 | Stelzer | 209/223.1 |
| 5,174,796 | A | 12/1992 | Davis et al. | 55/26 |
| 5,224,350 | A | 7/1993 | Mehra | 62/17 |
| 5,234,472 | A | 8/1993 | Krishnamurthy et al. | 95/98 |
| 5,292,990 | A | 3/1994 | Kantner et al. | 585/820 |
| 5,306,331 | A | 4/1994 | Auvil et al. | 95/42 |
| 5,354,346 | A | 10/1994 | Kumar | 95/101 |
| 5,365,011 | A | 11/1994 | Ramachandran et al. | 585/829 |
| 5,370,728 | A | 12/1994 | LaSala et al. | 95/101 |
| 5,486,227 | A | 1/1996 | Kumar et al. | |
| 5,547,641 | A | 8/1996 | Smith et al. | 422/181 |
| 5,565,018 | A | 10/1996 | Baksh et al. | 95/100 |
| 5,672,196 | A | 9/1997 | Acharya et al. | 95/97 |
| 5,700,310 | A | 12/1997 | Bowman et al. | 95/45 |
| 5,733,451 | A | 3/1998 | Coellner et al. | 210/496 |
| 5,735,938 | A | 4/1998 | Baksh et al. | 95/101 |
| 5,750,026 | A | 5/1998 | Gadkaree et al. | 201/502.1 |
| 5,769,928 | A * | 6/1998 | Leavitt | B01D 53/0446 95/119 |
| 5,792,239 | A | 8/1998 | Reinhold, III et al. | 95/101 |
| 5,807,423 | A | 9/1998 | Lemcoff et al. | 95/96 |
| 5,811,616 | A | 9/1998 | Holub et al. | 585/504 |
| 5,827,358 | A | 10/1998 | Kulish et al. | 96/115 |
| 5,906,673 | A | 5/1999 | Reinhold, III et al. | 95/45 |
| 5,912,426 | A | 6/1999 | Smolarek et al. | |
| 5,924,307 | A | 7/1999 | Nenov | 62/643 |
| 5,935,444 | A | 8/1999 | Johnson et al. | 210/691 |
| 5,968,234 | A | 10/1999 | Midgett, II et al. | 95/120 |
| 5,976,221 | A | 11/1999 | Bowman et al. | 95/45 |
| 5,997,617 | A | 12/1999 | Czabala et al. | 96/130 |
| 6,007,606 | A | 12/1999 | Baksh et al. | 95/98 |
| 6,011,192 | A | 1/2000 | Baker et al. | 585/818 |
| 6,023,942 | A | 2/2000 | Thomas et al. | 62/613 |
| 6,053,966 | A | 4/2000 | Moreau et al. | 95/96 |
| 6,063,161 | A | 5/2000 | Keefer et al. | 95/100 |
| 6,096,115 | A | 8/2000 | Kleinberg | |
| 6,099,621 | A | 8/2000 | Ho | 95/139 |
| 6,129,780 | A | 10/2000 | Millet et al. | 95/117 |
| 6,136,222 | A | 10/2000 | Friesen et al. | 252/184 |
| 6,147,126 | A | 11/2000 | DeGeorge et al. | 518/715 |
| 6,152,991 | A | 11/2000 | Ackley | |
| 6,156,101 | A | 12/2000 | Naheiri | |
| 6,171,371 | B1 | 1/2001 | Derive et al. | 95/98 |
| 6,176,897 | B1 | 1/2001 | Keefer | 95/98 |
| 6,179,900 | B1 | 1/2001 | Behling et al. | 95/45 |
| 6,183,538 | B1 | 2/2001 | Naheiri | |
| 6,194,079 | B1 | 2/2001 | Hekal | 428/566 |
| 6,210,466 | B1 | 4/2001 | Whysall et al. | 95/100 |
| 6,231,302 | B1 | 5/2001 | Bonardi | 415/105 |
| 6,245,127 | B1 | 6/2001 | Kane et al. | 95/101 |
| 6,284,021 | B1 | 9/2001 | Lu et al. | 95/96 |
| 6,311,719 | B1 | 11/2001 | Hill et al. | 137/312 |
| 6,334,889 | B1 * | 1/2002 | Smolarek | B01D 53/0423 96/137 |
| 6,345,954 | B1 | 2/2002 | Al-Himyary et al. | 415/112 |
| 6,398,853 | B1 | 6/2002 | Keefer et al. | 96/125 |
| 6,402,813 | B2 | 6/2002 | Monereau et al. | 95/96 |
| 6,406,523 | B1 | 6/2002 | Connor et al. | 96/125 |
| 6,425,938 | B1 | 7/2002 | Xu et al. | |
| 6,432,379 | B1 | 8/2002 | Heung | 423/648.1 |
| 6,436,171 | B1 | 8/2002 | Wang et al. | 95/96 |
| 6,444,012 | B1 | 9/2002 | Dolan et al. | 95/99 |
| 6,444,014 | B1 | 9/2002 | Mullhaupt et al. | 95/130 |
| 6,444,523 | B1 | 9/2002 | Fan et al. | 438/257 |
| 6,451,095 | B1 | 9/2002 | Keefer et al. | 96/125 |
| 6,457,485 | B2 | 10/2002 | Hill et al. | 137/240 |
| 6,471,744 | B1 | 10/2002 | Hill | |
| 6,471,939 | B1 | 10/2002 | Boix et al. | 423/706 |
| 6,488,747 | B1 | 12/2002 | Keefer | 96/125 |
| 6,497,750 | B2 | 12/2002 | Butwell et al. | 95/96 |
| 6,500,234 | B1 | 12/2002 | Ackley et al. | |
| 6,500,241 | B2 | 12/2002 | Reddy | 96/134 |
| 6,500,404 | B1 | 12/2002 | Camblor Fernandez et al. | 423/706 |
| 6,503,299 | B2 | 1/2003 | Baksh et al. | 95/98 |
| 6,506,351 | B1 | 1/2003 | Jain et al. | 423/239.1 |
| 6,514,318 | B2 | 2/2003 | Keefer | 95/96 |
| 6,514,319 | B2 | 2/2003 | Keefer et al. | 95/101 |
| 6,517,609 | B1 | 2/2003 | Monereau et al. | 95/96 |
| 6,531,516 | B2 | 3/2003 | Davis et al. | 518/700 |
| 6,533,846 | B1 | 3/2003 | Keefer et al. | 96/125 |
| 6,565,627 | B1 | 5/2003 | Golden et al. | 95/96 |
| 6,565,635 | B2 | 5/2003 | Keefer et al. | 96/125 |
| 6,565,825 | B2 | 5/2003 | Ohji et al. | 423/625 |
| 6,572,678 | B1 | 6/2003 | Wijmans et al. | 95/47 |
| 6,579,341 | B2 | 6/2003 | Baker et al. | 95/39 |
| 6,593,541 | B1 | 7/2003 | Herren | 219/121.67 |
| 6,595,233 | B2 | 7/2003 | Pulli | 137/115.05 |
| 6,605,135 | B2 * | 8/2003 | Lee | B01D 53/0423 55/513 |
| 6,605,136 | B1 | 8/2003 | Graham et al. | 95/98 |
| 6,607,584 | B2 | 8/2003 | Moreau et al. | 95/117 |
| 6,630,012 | B2 | 10/2003 | Wegeng et al. | 95/106 |
| 6,631,626 | B1 | 10/2003 | Hahn | 62/612 |
| 6,641,645 | B1 | 11/2003 | Lee et al. | 95/98 |
| 6,651,645 | B1 | 11/2003 | Nunez-Suarez | 126/9 R |
| 6,660,064 | B2 | 12/2003 | Golden et al. | 95/96 |
| 6,660,065 | B2 | 12/2003 | Byrd et al. | 95/117 |
| 6,692,626 | B2 | 2/2004 | Keefer et al. | 204/491 |
| 6,699,307 | B1 * | 3/2004 | Lomax, Jr. | B01D 53/053 95/104 |
| 6,712,087 | B2 | 3/2004 | Hill et al. | 137/240 |
| 6,729,039 | B2 * | 5/2004 | Crawford | B01D 53/0454 34/330 |
| 6,742,507 | B2 | 6/2004 | Keefer et al. | 123/585 |

(56) References Cited

U.S. PATENT DOCUMENTS

| | | | |
|---|---|---|---|
| 6,746,515 B2 | 6/2004 | Wegeng et al. .................. 95/96 |
| 6,752,852 B1 | 6/2004 | Jacksier et al. ................ 95/117 |
| 6,770,120 B2 | 8/2004 | Neu et al. ......................... 95/96 |
| 6,773,225 B2 | 8/2004 | Yuri et al. ........................ 415/1 |
| 6,802,889 B2 | 10/2004 | Graham et al. .................. 95/96 |
| 6,814,771 B2 | 11/2004 | Scardino et al. ............. 55/385.3 |
| 6,835,354 B2 | 12/2004 | Woods et al. ................. 422/139 |
| 6,840,985 B2 | 1/2005 | Keefer ........................... 96/125 |
| 6,866,950 B2 | 3/2005 | Connor et al. ................. 429/13 |
| 6,889,710 B2 | 5/2005 | Wagner .................... 137/625.46 |
| 6,890,376 B2 | 5/2005 | Arquin et al. ................. 96/134 |
| 6,893,483 B2 | 5/2005 | Golden et al. .................. 95/96 |
| 6,902,602 B2 | 6/2005 | Keefer et al. ................... 95/97 |
| 6,916,358 B2 | 7/2005 | Nakamura et al. ............. 95/96 |
| 6,918,953 B2* | 7/2005 | Lomax, Jr. ......... B01D 53/0446 95/96 |
| 6,921,597 B2 | 7/2005 | Keefer et al. .................. 429/34 |
| 6,974,496 B2 | 12/2005 | Wegeng et al. ................ 96/126 |
| 7,025,801 B2 | 4/2006 | Monereau ......................... 95/8 |
| 7,027,929 B2 | 4/2006 | Wang ............................. 702/17 |
| 7,029,521 B2 | 4/2006 | Johansson ..................... 96/128 |
| 7,074,323 B2 | 7/2006 | Ghijsen ......................... 208/101 |
| 7,077,891 B2 | 7/2006 | Jaffe et al. .................... 96/108 |
| 7,087,331 B2 | 8/2006 | Keefer et al. .................. 429/17 |
| 7,094,275 B2 | 8/2006 | Keefer et al. .................. 96/125 |
| 7,097,925 B2 | 8/2006 | Keefer et al. ..................... 429/9 |
| 7,112,239 B2 | 9/2006 | Kimbara et al. ............... 96/108 |
| 7,117,669 B2 | 10/2006 | Kaboord et al. .............. 60/288 |
| 7,122,073 B1 | 10/2006 | Notaro et al. |
| 7,128,775 B2 | 10/2006 | Celik et al. ..................... 95/96 |
| 7,144,016 B2 | 12/2006 | Gozdawa ..................... 277/399 |
| 7,160,356 B2 | 1/2007 | Koros et al. .................... 95/50 |
| 7,160,367 B2 | 1/2007 | Babicki et al. ................. 96/116 |
| 7,166,149 B2 | 1/2007 | Dunne et al. ................... 95/113 |
| 7,172,645 B1 | 2/2007 | Pfister et al. .................. 95/116 |
| 7,189,280 B2 | 3/2007 | Alizadeh-Khiavi et al. ... 95/130 |
| 7,250,073 B2 | 7/2007 | Keefer et al. ................... 95/96 |
| 7,250,074 B2 | 7/2007 | Tonkovich et al. ........... 95/130 |
| 7,255,727 B2 | 8/2007 | Monereau et al. .............. 95/96 |
| 7,258,725 B2 | 8/2007 | Ohmi et al. ..................... 95/41 |
| 7,276,107 B2 | 10/2007 | Baksh et al. ..................... 95/96 |
| 7,279,029 B2 | 10/2007 | Occhialini et al. ............. 96/121 |
| 7,285,350 B2 | 10/2007 | Keefer et al. .................. 429/34 |
| 7,297,279 B2 | 11/2007 | Johnson et al. .............. 210/669 |
| 7,311,763 B2 | 12/2007 | Neary .......................... 96/121 |
| RE40,006 E | 1/2008 | Keefer et al. .................. 95/100 |
| 7,314,503 B2 | 1/2008 | Landrum et al. ................ 95/50 |
| 7,354,562 B2 | 4/2008 | Ying et al. ................. 423/437.2 |
| 7,387,849 B2 | 6/2008 | Keefer et al. .................. 429/34 |
| 7,390,350 B2 | 6/2008 | Weist, Jr. et al. ............ 95/100 |
| 7,404,846 B2 | 7/2008 | Golden et al. ................. 95/103 |
| 7,438,079 B2 | 10/2008 | Cohen et al. |
| 7,445,663 B1* | 11/2008 | Hunter ................. B01D 53/047 128/204.21 |
| 7,449,049 B2 | 11/2008 | Thomas et al. ................ 95/123 |
| 7,456,131 B2 | 11/2008 | Klett et al. .................... 502/417 |
| 7,510,601 B2 | 3/2009 | Whitley et al. ................ 96/121 |
| 7,527,670 B2 | 5/2009 | Ackley et al. .................. 95/96 |
| 7,553,568 B2 | 6/2009 | Keefer ........................... 429/13 |
| 7,578,864 B2 | 8/2009 | Watanabe et al. ............. 55/523 |
| 7,604,682 B2 | 10/2009 | Seaton ............................. 95/96 |
| 7,637,989 B2 | 12/2009 | Bong ............................ 96/130 |
| 7,641,716 B2 | 1/2010 | Lomax, Jr. et al. ............. 95/96 |
| 7,645,324 B2 | 1/2010 | Rode et al. ...................... 95/96 |
| 7,651,549 B2 | 1/2010 | Whitley .......................... 95/96 |
| 7,674,319 B2 | 3/2010 | Lomax, Jr. et al. ............. 95/19 |
| 7,674,539 B2 | 3/2010 | Keefer et al. .................. 429/17 |
| 7,687,044 B2 | 3/2010 | Keefer et al. ................. 422/211 |
| 7,713,333 B2 | 5/2010 | Rege et al. ..................... 95/96 |
| 7,717,981 B2 | 5/2010 | LaBuda et al. ................ 95/96 |
| 7,722,700 B2 | 5/2010 | Sprinkle ......................... 95/22 |
| 7,731,782 B2 | 6/2010 | Kelley et al. ................. 95/139 |
| 7,740,687 B2 | 6/2010 | Reinhold, III .................. 95/96 |
| 7,744,676 B2 | 6/2010 | Leitmayr et al. ............... 95/99 |
| 7,744,677 B2 | 6/2010 | Barclay et al. ................ 95/114 |
| 7,758,051 B2 | 7/2010 | Roberts-Haritonov et al. ............ 277/401 |
| 7,758,988 B2 | 7/2010 | Keefer et al. .................. 429/34 |
| 7,763,098 B2 | 7/2010 | Alizadeh-Khiavi et al. ..... 95/96 |
| 7,763,099 B2 | 7/2010 | Verma et al. .................... 95/96 |
| 7,792,983 B2 | 9/2010 | Mishra et al. ................ 709/231 |
| 7,793,675 B2 | 9/2010 | Cohen et al. |
| 7,806,965 B2 | 10/2010 | Stinson ......................... 95/187 |
| 7,819,948 B2 | 10/2010 | Wagner ......................... 95/100 |
| 7,828,877 B2 | 11/2010 | Sawada et al. .................. 95/96 |
| 7,828,880 B2 | 11/2010 | Moriya et al. ................ 95/210 |
| 7,854,793 B2 | 12/2010 | Rarig et al. .................... 96/116 |
| 7,858,169 B2 | 12/2010 | Yamashita .................... 428/116 |
| 7,862,645 B2 | 1/2011 | Whitley et al. ................. 95/96 |
| 7,867,320 B2 | 1/2011 | Baksh et al. .................... 95/96 |
| 7,902,114 B2 | 3/2011 | Bowie et al. |
| 7,938,886 B2 | 5/2011 | Hershkowitz et al. ......... 95/115 |
| 7,947,118 B2 | 5/2011 | Rarig et al. ..................... 95/98 |
| 7,947,120 B2 | 5/2011 | Deckman et al. ............. 95/139 |
| 7,959,720 B2 | 6/2011 | Deckman et al. ............. 96/130 |
| 8,016,918 B2 | 9/2011 | LaBuda et al. .................. 95/96 |
| 8,034,164 B2 | 10/2011 | Lomax, Jr. et al. ........... 95/121 |
| 8,071,063 B2 | 12/2011 | Reyes et al. .................. 423/248 |
| 8,128,734 B2 | 3/2012 | Song ............................... 95/96 |
| 8,142,745 B2 | 3/2012 | Reyes et al. ............... 423/213.2 |
| 8,142,746 B2 | 3/2012 | Reyes et al. ............... 423/213.2 |
| 8,192,709 B2 | 6/2012 | Reyes et al. ............... 423/245.1 |
| 8,210,772 B2 | 7/2012 | Gillecriosd .................. 405/128.2 |
| 8,227,121 B2 | 7/2012 | Adams et al. ................. 429/429 |
| 8,262,773 B2 | 9/2012 | Northrop et al. .............. 95/114 |
| 8,262,783 B2 | 9/2012 | Stoner et al. .................. 96/108 |
| 8,268,043 B2 | 9/2012 | Celik et al. ..................... 95/96 |
| 8,268,044 B2 | 9/2012 | Wright et al. ................... 95/96 |
| 8,272,401 B2 | 9/2012 | McLean .................... 137/625.11 |
| 8,287,629 B2 | 10/2012 | Fujita et al. ................... 96/126 |
| 8,319,090 B2 | 11/2012 | Kitamura ...................... 136/244 |
| 8,337,594 B2 | 12/2012 | Corma Canos et al. ........ 95/130 |
| 8,361,200 B2 | 1/2013 | Sayari et al. .................. 95/139 |
| 8,361,205 B2 | 1/2013 | Desai et al. ................... 96/121 |
| 8,377,173 B2 | 2/2013 | Chuang ......................... 95/135 |
| 8,444,750 B2 | 5/2013 | Deckman et al. ............... 95/96 |
| 8,470,395 B2 | 6/2013 | Khiavi et al. ................. 427/180 |
| 8,480,795 B2 | 7/2013 | Siskin et al. .................... 95/235 |
| 8,512,569 B2 | 8/2013 | Eaton et al. .................. 210/650 |
| 8,518,356 B2 | 8/2013 | Schaffer et al. .............. 423/220 |
| 8,529,662 B2 | 9/2013 | Kelley et al. ................... 95/96 |
| 8,529,663 B2 | 9/2013 | Reyes et al. .................... 95/96 |
| 8,529,664 B2 | 9/2013 | Deckman et al. ............... 95/96 |
| 8,529,665 B2 | 9/2013 | Manning et al. ................ 95/96 |
| 8,535,414 B2 | 9/2013 | Johnson et al. ................. 95/95 |
| 8,545,602 B2 | 10/2013 | Chance et al. ................... 95/96 |
| 8,551,444 B2 | 10/2013 | Agnihotri et al. ......... 423/648.1 |
| 8,573,124 B2 | 11/2013 | Havran et al. ................ 102/206 |
| 8,591,627 B2 | 11/2013 | Jain ................................. 95/52 |
| 8,591,634 B2 | 11/2013 | Winchester et al. ............ 96/127 |
| 8,616,233 B2 | 12/2013 | McLean et al. ......... 137/246.22 |
| 8,657,922 B2 | 2/2014 | Yamawaki et al. .............. 95/96 |
| 8,673,059 B2 | 3/2014 | Leta et al. ..................... 95/104 |
| 8,680,344 B2 | 3/2014 | Weston et al. |
| 8,715,617 B2 | 5/2014 | Genkin et al. ................ 423/652 |
| 8,752,390 B2 | 6/2014 | Wright et al. .................. 60/780 |
| 8,778,051 B2 | 7/2014 | Weist, Jr. et al. ............... 95/98 |
| 8,784,533 B2 | 7/2014 | Leta et al. ....................... 95/97 |
| 8,784,534 B2 | 7/2014 | Kamakoti et al. ............... 95/97 |
| 8,784,535 B2 | 7/2014 | Ravikovitch et al. ........... 95/98 |
| 8,795,411 B2 | 8/2014 | Hufton et al. ................... 95/90 |
| 8,808,425 B2 | 8/2014 | Genkin et al. ................... 95/96 |
| 8,808,426 B2 | 8/2014 | Sundaram ....................... 95/96 |
| 8,814,985 B2 | 8/2014 | Gerds et al. ..................... 95/90 |
| 8,852,322 B2 | 10/2014 | Gupta et al. .................... 95/136 |
| 8,858,683 B2 | 10/2014 | Deckman ........................ 95/96 |
| 8,875,483 B2 | 11/2014 | Wettstein ..................... 60/39.52 |
| 8,906,138 B2 | 12/2014 | Rasmussen et al. ............. 95/96 |
| 8,921,637 B2 | 12/2014 | Sundaram et al. ............. 585/823 |
| 8,939,014 B2 | 1/2015 | Kamakoti et al. ............... 73/38 |
| 9,005,561 B2 | 4/2015 | Leta |
| 9,017,457 B2 | 4/2015 | Tammera ....................... 95/96 |
| 9,028,595 B2 | 5/2015 | Sundaram et al. |
| 9,034,078 B2 | 5/2015 | Wanni et al. ...................... 95/8 |

(56) References Cited

U.S. PATENT DOCUMENTS

| | | | |
|---|---|---|---|
| 9,034,079 B2 | 5/2015 | Deckman et al. | 95/96 |
| 9,050,553 B2 | 6/2015 | Alizadeh-Khiavi et al. | |
| 9,067,168 B2 | 6/2015 | Frederick et al. | 96/108 |
| 9,095,809 B2 | 8/2015 | Deckman et al. | 95/45 |
| 9,108,145 B2 | 8/2015 | Kalbassi et al. | 95/8 |
| 9,120,049 B2 | 9/2015 | Sundaram et al. | 96/121 |
| 9,126,138 B2 | 9/2015 | Deckman et al. | 95/95 |
| 9,162,175 B2 | 10/2015 | Sundaram | 96/121 |
| 9,168,485 B2 | 10/2015 | Deckman et al. | 95/96 |
| 9,452,387 B2* | 9/2016 | Pedace | B01D 53/261 |
| 2001/0047824 A1 | 12/2001 | Hill et al. | 137/312 |
| 2002/0053547 A1 | 5/2002 | Schlegel et al. | |
| 2002/0124885 A1 | 9/2002 | Hill et al. | 137/312 |
| 2002/0162452 A1 | 11/2002 | Butwell et al. | 95/96 |
| 2003/0075485 A1 | 4/2003 | Ghijsen | 208/308 |
| 2003/0129101 A1 | 7/2003 | Zettel | 422/179 |
| 2003/0131728 A1 | 7/2003 | Kanazirev et al. | 95/96 |
| 2003/0170527 A1 | 9/2003 | Finn et al. | 429/34 |
| 2003/0202918 A1 | 10/2003 | Ashida et al. | 422/180 |
| 2003/0205130 A1 | 11/2003 | Neu et al. | 95/90 |
| 2003/0223856 A1 | 12/2003 | Yuri et al. | 415/1 |
| 2004/0099142 A1 | 5/2004 | Arquin et al. | 96/134 |
| 2004/0118277 A1 | 6/2004 | Kim | |
| 2004/0197596 A1 | 10/2004 | Connor et al. | 428/630 |
| 2004/0232622 A1 | 11/2004 | Gozdawa | 277/401 |
| 2005/0005771 A1 | 1/2005 | Lomax et al. | |
| 2005/0045041 A1 | 3/2005 | Hechinger et al. | |
| 2005/0109419 A1 | 5/2005 | Ohmi et al. | 141/4 |
| 2005/0114032 A1 | 5/2005 | Wang | 702/14 |
| 2005/0129952 A1 | 6/2005 | Sawada et al. | 428/409 |
| 2005/0014511 A1 | 7/2005 | Keefer et al. | 96/124 |
| 2005/0145111 A1 | 7/2005 | Keefer et al. | 96/124 |
| 2005/0150378 A1 | 7/2005 | Dunne et al. | 95/113 |
| 2005/0229782 A1 | 10/2005 | Monereau et al. | 95/96 |
| 2005/0252378 A1 | 11/2005 | Celik et al. | 96/121 |
| 2006/0017940 A1 | 1/2006 | Takayama | |
| 2006/0048648 A1 | 3/2006 | Gibbs et al. | 96/108 |
| 2006/0049102 A1 | 3/2006 | Miller et al. | 210/500.27 |
| 2006/0076270 A1 | 4/2006 | Poshusta et al. | 208/208 |
| 2006/0099096 A1 | 5/2006 | Shaffer et al. | 418/55.1 |
| 2006/0105158 A1 | 5/2006 | Fritz et al. | 428/317.9 |
| 2006/0162556 A1 | 7/2006 | Ackley et al. | 95/96 |
| 2006/0165574 A1 | 7/2006 | Sayari | 423/210 |
| 2006/0169142 A1 | 8/2006 | Rode et al. | 96/129 |
| 2006/0236862 A1 | 10/2006 | Golden et al. | 95/96 |
| 2007/0084241 A1 | 4/2007 | Kretchmer et al. | 63/29.2 |
| 2007/0084344 A1 | 4/2007 | Moriya et al. | 95/210 |
| 2007/0222160 A1 | 9/2007 | Roberts-Haritonov et al. | 277/387 |
| 2007/0253872 A1 | 11/2007 | Keefer et al. | 422/143 |
| 2007/0261550 A1 | 11/2007 | Ota | |
| 2007/0261557 A1 | 11/2007 | Gadkaree et al. | 96/121 |
| 2007/0283807 A1 | 12/2007 | Whitley | 95/96 |
| 2008/0051279 A1 | 2/2008 | Klett et al. | 502/60 |
| 2008/0072825 A1 | 3/2008 | White | 118/722 |
| 2008/0128655 A1 | 6/2008 | Garg et al. | 252/373 |
| 2008/0282883 A1 | 11/2008 | Rarig et al. | 95/96 |
| 2008/0282884 A1 | 11/2008 | Kelley et al. | 95/96 |
| 2008/0282885 A1 | 11/2008 | Deckman et al. | 95/98 |
| 2008/0282886 A1 | 11/2008 | Reyes et al. | 95/98 |
| 2008/0282887 A1 | 11/2008 | Chance et al. | 95/98 |
| 2008/0282892 A1 | 11/2008 | Deckman et al. | 96/140 |
| 2008/0289497 A1 | 11/2008 | Barclay et al. | 95/114 |
| 2008/0307966 A1 | 12/2008 | Stinson | 95/187 |
| 2008/0314550 A1* | 12/2008 | Greco | F28D 17/04 165/4 |
| 2009/0004073 A1 | 1/2009 | Gleize et al. | 422/180 |
| 2009/0014902 A1 | 1/2009 | Koivunen et al. | 265/11 |
| 2009/0025553 A1 | 1/2009 | Keefer et al. | 95/96 |
| 2009/0025555 A1 | 1/2009 | Lively et al. | |
| 2009/0037550 A1 | 2/2009 | Mishra et al. | 708/208 |
| 2009/0071333 A1 | 3/2009 | LaBuda et al. | 95/96 |
| 2009/0079870 A1 | 3/2009 | Matsui | 348/558 |
| 2009/0107332 A1 | 4/2009 | Wagner | 95/100 |
| 2009/0151559 A1 | 6/2009 | Verma et al. | 95/96 |
| 2009/0162268 A1 | 6/2009 | Hufton et al. | 423/210 |
| 2009/0180423 A1 | 7/2009 | Kroener | 370/328 |
| 2009/0241771 A1 | 10/2009 | Manning et al. | 95/15 |
| 2009/0284013 A1 | 11/2009 | Anand et al. | 290/52 |
| 2009/0294366 A1 | 12/2009 | Wright et al. | |
| 2009/0308248 A1 | 12/2009 | Siskin et al. | 95/236 |
| 2009/0314159 A1 | 12/2009 | Haggerty | 95/90 |
| 2010/0059701 A1 | 3/2010 | McLean | 251/304 |
| 2010/0077920 A1 | 4/2010 | Baksh et al. | 95/97 |
| 2010/0089241 A1 | 4/2010 | Stoner et al. | 96/125 |
| 2010/0186445 A1 | 7/2010 | Minta et al. | 62/606 |
| 2010/0212493 A1 | 8/2010 | Rasmussen et al. | 95/45 |
| 2010/0251887 A1 | 10/2010 | Jain | 95/46 |
| 2010/0252497 A1 | 10/2010 | Ellison et al. | 210/500.1 |
| 2010/0263534 A1 | 10/2010 | Chuang | 95/139 |
| 2010/0282593 A1 | 11/2010 | Speirs et al. | 203/11 |
| 2010/0288704 A1 | 11/2010 | Amsden et al. | 210/688 |
| 2011/0011803 A1 | 1/2011 | Koros | |
| 2011/0031103 A1 | 2/2011 | Deckman et al. | 203/41 |
| 2011/0067440 A1 | 3/2011 | Van Aken | 62/613 |
| 2011/0067770 A1 | 3/2011 | Pederson et al. | 137/625.15 |
| 2011/0146494 A1 | 6/2011 | Desai et al. | 96/115 |
| 2011/0217218 A1 | 9/2011 | Gupta et al. | 423/228 |
| 2011/0277620 A1 | 11/2011 | Havran et al. | 89/1.14 |
| 2011/0291051 A1 | 12/2011 | Hershkowitz et al. | 252/373 |
| 2011/0296871 A1 | 12/2011 | Van Soest-Vercammen et al. | 62/636 |
| 2011/0308524 A1 | 12/2011 | Brey et al. | 128/205.12 |
| 2012/0024152 A1 | 2/2012 | Yamawaki et al. | 95/96 |
| 2012/0031144 A1 | 2/2012 | Northrop et al. | 62/617 |
| 2012/0067216 A1 | 3/2012 | Corma Canos et al. | 95/95 |
| 2012/0152115 A1 | 6/2012 | Gerds et al. | 95/90 |
| 2012/0222551 A1 | 9/2012 | Deckman | 95/96 |
| 2012/0222552 A1 | 9/2012 | Ravikovitch et al. | 95/97 |
| 2012/0222553 A1 | 9/2012 | Kamakoti et al. | 95/99 |
| 2012/0222554 A1 | 9/2012 | Leta et al. | 95/104 |
| 2012/0222555 A1 | 9/2012 | Gupta et al. | 95/136 |
| 2012/0255377 A1 | 10/2012 | Kamakoti et al. | 73/863.23 |
| 2012/0308456 A1 | 12/2012 | Leta et al. | 423/228 |
| 2012/0312163 A1 | 12/2012 | Leta et al. | 95/97 |
| 2013/0061755 A1 | 3/2013 | Frederick et al. | 96/110 |
| 2013/0216627 A1 | 8/2013 | Galbraith et al. | |
| 2013/0225898 A1 | 8/2013 | Sundaram et al. | 585/802 |
| 2013/0340619 A1 | 12/2013 | Tammera | |
| 2014/0013955 A1 | 1/2014 | Tammera et al. | 95/115 |
| 2014/0060326 A1 | 3/2014 | Sundaram | 95/96 |
| 2014/0157986 A1 | 6/2014 | Ravikovitch et al. | 95/96 |
| 2014/0208797 A1 | 7/2014 | Kelley et al. | 62/611 |
| 2014/0216254 A1 | 8/2014 | Tammera et al. | 95/114 |
| 2015/0013377 A1 | 1/2015 | Oelfke | |
| 2015/0068397 A1 | 3/2015 | Boulet et al. | |
| 2015/0196870 A1 | 7/2015 | Albright et al. | |
| 2017/0266604 A1* | 9/2017 | Tammera | B01D 53/0446 |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| FR | 2 988 623 | 10/2013 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO 99/28013 | 6/1999 |
| WO | WO2002/024309 | 3/2002 |

(56) References Cited

FOREIGN PATENT DOCUMENTS

| WO | WO2002/073728 | 9/2002 |
|----|---------------|--------|
| WO | WO2005/090793 | 9/2005 |
| WO | WO2011/139894 | 11/2011 |

OTHER PUBLICATIONS

ExxonMobil Research and Engineering and Xebec (2008) RCPSA—Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

GE Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin (May 19, 2007) "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEM FOR SWING ADSORPTION PROCESSES RELATED THERETO

CROSS-REFERENCE TO RELATED APPLICATION

This application claims the benefit of U.S. Provisional Patent Application 62/246,916, filed Oct. 27, 2015 entitled APPARATUS AND SYSTEM FOR SWING ADSORPTION PROCESSES RELATED THERETO, the entirety of which is incorporated by reference herein.

FIELD

The present techniques relate to a system and method associated with an enhanced swing adsorption process. In particular, the system relates to a swing adsorption process for the removing contaminants from a feed stream utilizing adsorbent bed units.

BACKGROUND

Gas separation is useful in many industries and can typically be accomplished by flowing a mixture of gases over an adsorbent material that preferentially adsorbs one or more gas components in a feed stream, while not adsorbing one or more other gas components. The non-adsorbed components are recovered as a separate product. The separation of gas components by adsorption is a conventional approach that is performed in a variety of approaches. For example, adsorptive separations may be based on the differences in equilibrium affinities of the various gas components (e.g., equilibrium separations) or on the differences in adsorption kinetics of the gas components (e.g., kinetics separations).

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of certain gas components being more readily adsorbed within the pore structure or free volume of an adsorbent material when the gas component is under pressure. That is, the higher the gas pressure, the greater the amount of readily-adsorbed gas adsorbed. When the pressure is reduced, the adsorbed gas component is released, or desorbed from the adsorbent material.

The swing adsorption processes (e.g., PSA and TSA) may be used to separate gas components of a gas mixture because different gas components tend to fill the micropore of the adsorbent material to different extents. For example, if a gas mixture, such as natural gas, is passed under pressure through an adsorbent bed unit, which may referred to as adsorption bed unit or vessel, containing an adsorbent material that is more selective towards carbon dioxide than it is for methane, at least a portion of the carbon dioxide is selectively adsorbed by the adsorbent material, and the gas exiting the adsorbent bed unit is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

The swing adsorption processes typically involve adsorbent bed units, which include an adsorbent material disposed within the housing of the adsorbent bed unit. These adsorbent bed units utilize different packing material in the adsorbent bed structures. For example, the adsorbent bed units utilize checker brick, pebble beds or other available packing. As an enhancement, some adsorbent bed units may utilize engineered packing within the adsorbent bed structure. The engineered packing may include a material provided in a specific configuration, such as a honeycomb, ceramic forms or the like. The engineered packing may be formed from the adsorbent material or may be a coating on a structure or support.

Further, various adsorbent bed units may be coupled together with conduits, manifolds and valves to manage the flow of fluids. Orchestrating these adsorbent bed units involves coordinating the cycles for each of the adsorbent bed units with other adsorbent bed units in the system. A complete cycle can vary from seconds to minutes as it transfers a plurality of gaseous streams through one or more of the adsorbent bed units.

However, swing adsorption processes present certain challenges because of several demanding technical factors, such as rapid cycle adsorption processes. These factors may include maintaining a low pressure drop through the adsorbent bed, good flow distribution within the adsorbent bed and minimal dispersion (e.g., axial spreading) of the concentration front in the adsorbent bed. Also, another factor may include a rapid cycling time that in turn requires fast acting and low dead-volume valves. Finally, another factor may be that an adsorbent bed unit should be configured to contain the adsorbent bed at certain pressures, to support the fast acting valves, and to minimize the dead volume within the adsorbent bed unit.

These challenges are even more complicated for processes with very high volumetric flows. A typical rapid cycle adsorbent bed unit is configured as a vertical cylinder with flat endplates (heads) for minimizing dead volume. Flow enters and exits the adsorbent bed unit through fast-acting valves mounted on the flat heads adjacent to the adsorbent material. The requirements for flat heads and high design pressures introduce practical limitations to the adsorbent bed diameter. For example, for a maximum working pressure of 85 bar absolute (bara), the practical maximum adsorbent bed unit inside diameter is approximately 1.4 meters (m), and the corresponding flat head thickness is approximately 355 millimeters (mm) to 380 mm. The fatigue life and cyclic deflection of the head is strongly influenced by the number and sizes of bores through the head for the valves. As such, the number and size of the bores through the head is a limiting factor in the design of an adsorbent bed unit.

Yet, the footprint (e.g., surface area) available on top of the adsorbent bed unit adjacent to the adsorbent bed may not accommodate the valves. For example, adsorbent beds may have cylindrical forms to present a circular cross-section area to the streams entering the adsorbent bed unit, where the valves are installed. The valves themselves have a similar footprint, which is also circular. As such, even when these valves are packed closely, a sizeable amount of footprint on top of the adsorbent beds is inaccessible for installation of the valves. Thus, the conventional bed structures do not accommodate valves for various configurations.

Accordingly, there remains a need in the industry for apparatus, methods, and systems that provided enhancements to manage the flow of fluids to the adsorbent beds. The present techniques overcome the drawbacks of conventional swing adsorption approaches by using oversized heads to provide flow paths for the gas volumes. This present techniques provide a lower capital investment, much smaller equipment foot-print, and lower hydrocarbon losses, compared to conventional gas conditioning processes.

SUMMARY OF THE INVENTION

In one embodiment, the present techniques describe a cyclical swing adsorbent bed unit for removing contaminants from a gaseous feed stream. The adsorbent bed unit comprising: a housing forming an interior region; an adsorbent bed disposed within the interior region; a plurality of valves secured to the housing, wherein each of the plurality of valves is configured to control fluid flow along a flow path extending from a location external to the housing through a conduit and to the adsorbent bed, wherein at least one of the plurality of valves has a valve cross sectional area disposed at least partially outside of an interface cross sectional area of the adsorbent bed.

In yet another embodiment, a process for removing contaminants from a feed stream is described. The process comprising: a) performing one or more adsorption steps in an adsorbent bed unit, wherein each of the one or more adsorption steps comprise: (i) opening a plurality of feed poppet valves to pass a gaseous feed stream from a feed inlet conduit to an adsorbent bed disposed in an interior region of a housing of the adsorbent bed unit, wherein each of the plurality of feed poppet valves is in direct flow communication with the feed inlet conduit and configured to control fluid flow along a flow path extending from a location external to the housing through the feed inlet conduit and to the adsorbent bed, wherein at least one of the plurality of feed poppet valves has a valve cross sectional area disposed at least partially outside of an interface cross sectional area of the adsorbent bed, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit; b) performing one or more purge steps, wherein each of the one or more purge steps comprise passing a purge stream into the adsorbent bed unit to conduct away at least a portion of the one or more contaminants in a purge output stream; and c) repeating the steps a) to b) for at least one additional cycle, wherein the cycle duration is for a period greater than 1 second and less than 600 seconds.

In still yet another embodiment, a method of manufacturing a cyclical swing adsorbent bed unit is described. The method comprising: forming a housing having an interior region; disposing an adsorbent bed within the interior region of the housing; creating a plurality of valve ports into the housing; securing a valve to the housing in each of the plurality of valve ports to form a plurality of valves, wherein each of the plurality of valves is configured to control fluid flow along a flow path extending from a location external to the housing to the adsorbent bed, wherein at least one of the plurality of valves have a valve cross sectional area disposed at least partially outside of an interface cross sectional area of the adsorbent bed.

In still yet another embodiment, a process for removing contaminants from a feed stream is described. The process comprises: a) performing one or more adsorption steps in an adsorbent bed unit, wherein each of the one or more adsorption steps comprise: (i) opening one or more feed poppet valves to pass a feed stream from a feed inlet conduit to an adsorbent bed disposed in an interior region of a housing of the adsorbent bed unit, wherein each of the one or more feed poppet valves is in direct flow communication with the feed inlet conduit and configured to control fluid flow along a flow path extending from a location external to the housing through the feed inlet conduit and to the adsorbent bed, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit; b) performing one or more purge steps, wherein each of the one or more purge steps comprise passing a purge stream into the adsorbent bed unit through one or more purge poppet valves and conducting away at least a portion of the one or more contaminants in a purge output stream via one or more purge output poppet valves; and c) repeating the steps a) to b) for at least one additional cycle, wherein the cycle duration is for a period greater than 1 second and less than 600 seconds, wherein at least one of the one or more feed poppet valves, one or more product poppet valves, one or more purge poppet valves and/or one or more purge output poppet valves has a valve cross sectional area disposed at least partially outside of an interface cross sectional area of the adsorbent bed.

In one or more embodiments, the cyclical swing adsorbent bed unit may include various modifications. For example, the housing may comprise a head coupled to a body portion to form the housing, and the plurality of valves are secured to the head; a head coupled to a body portion to form the housing; wherein one or more of the plurality of valves are secured to the head, and a plate adjacent to the head, wherein the at least one of the plurality of valves is secured to the plate; a head engaged with a body portion, and the plurality of valves are secured to the body portion; a head engaged with a body portion, and the plurality of valves are secured to the body portion. Further, the body portion may comprise a first body portion surrounding the adsorbent bed having a first inner diameter and a second body portion adjacent to the first body portion having a second inner diameter, wherein the second inner diameter is greater than the first inner diameter.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
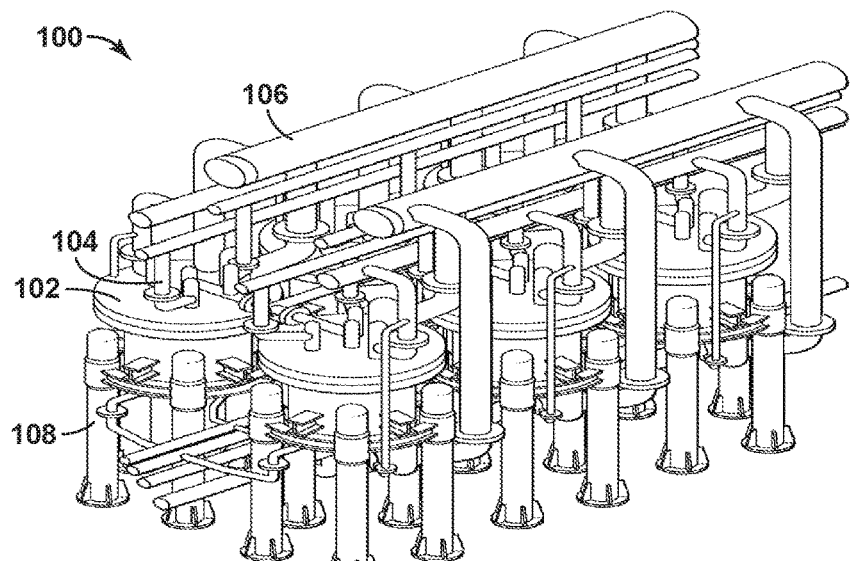
FIG. 1 is a three-dimensional diagram of a swing adsorption system with six conventional adsorbent bed units and interconnecting piping.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

The term "in direct flow communication" or "in direct fluid communication" means in direct flow communication without intervening valves or other closure means for obstructing flow. However, the term "in direct flow communication" may include distributors or other distribution mechanisms to distribute the flow along the flow path. As may be appreciated, other variations may also be envisioned within the scope of the present techniques.

The term "interface cross sectional area" means the cross sectional area of an end of the adsorbent bed where the stream enters or exits the adsorbent bed. For example, if a feed stream enters an adsorbent bed at a first end, the cross sectional area of the first end is the interface cross sectional area. As may be appreciated, other variations may also be envisioned within the scope of the present techniques.

The term "valve cross sectional area" means the cross sectional area of a valve relative to an end of the valve where the stream enters or exits the valve. For example, the valve opening may be the valve cross sectional area. In particular, for a poppet valve, a disk element moves to provide a flow passage around the disk element when it is in the open position. Accordingly, the valve opening formed by the disk element's movement away from the valve seat is utilized to determine the valve cross sectional area for the poppet valve, which may be the cross sectional area of the disk element. As may be appreciated, other variations may also be envisioned within the scope of the present techniques.

The term "valve cross sectional area disposed at least partially outside of an interface cross sectional area" means that the valve cross sectional area is at least partially outside or extending beyond the interface cross sectional area when viewed along an axis passing directly through the adsorbent bed along the predominate flow path. For example, the adsorbent bed has an interface at one end where flow enters or exits the adsorbent bed. The interface has a length and a width, while the depth is direction of flow of the stream along the predominate flow path through the adsorbent bed.

The present techniques relate to a swing adsorption process (e.g., a rapid cycle process) for the removing contaminants from a feed stream (e.g., natural gas) utilizing rapidly cycled adsorbent beds. The present techniques balance the diameter of the adsorbent bed unit being minimized, while maximizing the volumetric throughput. The high volumetric throughput involved tend to involve larger and/or more valves. In many configurations, the surface of the adsorbent bed unit's head provides insufficient space (e.g., not adequate available surface area or footprint on the flat head) for the required number of valves and associated size of the valves, while maintaining reasonable pressure drops through the valves. Accordingly, the present techniques provide an adsorbent bed unit that accommodates the necessary valves, while maintaining the diameter of adsorbent bed in the adsorbent bed unit. In this configuration, at least some of the valves have valve cross sectional area disposed at least partially outside of or beyond an interface cross sectional area (e.g., cross sectional are defined by an interface to the adsorbent bed). Further, the configuration may minimize the number of adsorbent bed units utilized for a given application.

In contrast to conventional approaches, the present techniques provide additional space (e.g., footprint) to accommodate fluid flow into the adsorbent bed by having some of the valves disposed at least partially outside of an interface cross sectional area. For example, in conventional configurations, the adsorbent bed has an interface cross section area, which has the valves in direct flow communication with the adsorbent bed disposed directly adjacent to the adsorbent bed and within the interface cross sectional area. In the present techniques, the valves are disposed at least partially outside the interface cross sectional area. In particular, some of the valves disposed in the head have a valve cross sectional area that is disposed along or outside of an outer perimeter of the adsorbent bed. Accordingly, the present techniques increase the footprint available adjacent to an interface or end of the adsorbent bed where the stream enters or exits the adsorbent bed. The valves may be configured to operate (e.g., open or close) via a common actuation mechanism for each stream (e.g., a lift plate or other actuation mechanism).

In one or more embodiments, the adsorbent bed unit may be a modified vertical cylindrical adsorbent bed unit that is configured to have a portion of the flow valves not disposed directly adjacent to the adsorbent bed or not within the interface cross sectional area of the adsorbent bed. For example, the primary flow valves may be disposed on the head of the adsorbent bed unit directly adjacent to the adsorbent bed (e.g., within the interface cross sectional area), while the secondary flow valves are configured to be disposed in an outlying location (e.g., at least a portion of the secondary flow valves are disposed at least partially outside the interface cross sectional area). This configuration provides additional space for valves than may be located directly adjacent to the adsorbent bed. The outlying valve mounting locations may be formed integrally with the unit's head, or it may be formed in a separate plate that is located between the units flange and the unit's head. While single valves may be disposed in the different locations, multiple valves may also be used depending on the requirements of the specific application. Also, the valves may be actively-controlled valves and/or passively-controlled valves. A passively-controlled valve may be opened by the differential pressure acting across its moving element (e.g., disk element) without the need to otherwise actuate the moving element.

Beneficially, this embodiment provides various enhancements to the process. For example, one enhancement is the ability to locate a larger number of valves than possible is in the available space on the adsorbent bed unit's head directly above the adsorbent material within the interface cross sectional area of the adsorbent bed. Another enhancement is the ability to integrate a separate plate supporting the secondary valves with the existing unit's head. Further, yet another enhancement provides the ability to support both actively-controlled valves and/or passively-controlled valves. Finally, another enhancement is the ability to integrate with a variety of gas treating processes.

Also, the present techniques may also include various pressures for the feed stream and the purge stream. As a result, the adsorbent bed unit may operate in a range of pressures from 5 pounds per square inch absolute (psia) to 1,400 psia. For example, the feed pressure may be based on the preferred adsorption feed pressure, which may be in the range from 400 psia to 1,400 psia, or in the range from 600 psia to 1,200 psia. Also, the purge pressure may be based on the preferred adsorbent purge pressure, which may be in the range from 50 psia to 800 psia, or in the range from 400 psia to 600 psia.

The present techniques may be integrated into a various configurations. For example, the adsorbent bed unit may include structured or unstructured adsorbent beds, and the adsorbent bed unit may also include additional features to facilitate flow straightening and flow distribution. Also, the present techniques may be utilized, but not limited to, dehydration prior to and integrated with a cryogenic Natural Gas Liquid (NGL) recovery, which may involve removing contaminants to cryogenic processing feed gas specifications. Other integrations may include liquefied natural gas (LNG) plant, or other such plants. Regardless, the present techniques may be used to treat feed streams containing excessive amounts of contaminants, such as water and $CO_2$. The present techniques may also be used to remove contaminants to other specifications, such as cryogenic natural gas liquefaction specifications for a cryogenic natural gas liquefaction recovery plant.

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Patent Application Publication Nos. 2008/0282892, 2008/0282887, 2008/0282886, 2008/0282885, 2008/0282884 and 2014/0013955, which are each herein incorporated by reference in their entirety.

In certain embodiments, the adsorbent bed unit may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head. The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds and/or headers.

Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants and heavy hydrocarbons (e.g., hydrocarbons having at least two carbon atoms). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

In other embodiments, the present techniques may be used to lessen contaminants of the stream to a specific level by the swing adsorption process. The pressures and different streams utilized in these processes increases the number of valves utilized in the process. Accordingly, the present techniques provide additional space for valves, such as poppet valves, by disposing some or a portion of the valves outside of an interface cross sectional area of the adsorbent bed (e.g., at least one of the valves have a valve cross sectional area disposed at least partially outside of an interface cross sectional area of the adsorbent bed).

In certain configurations, a process or system for removing contaminants from a feed stream may include one of the valves that has a valve cross sectional area disposed at least partially outside of an interface cross sectional area of the adsorbent bed. The process may include: a) performing one or more adsorption steps in an adsorbent bed unit, wherein each of the one or more adsorption steps comprise: (i) opening one or more feed poppet valves to pass a gaseous feed stream from a feed inlet conduit to an adsorbent bed disposed in an interior region of a housing of the adsorbent bed unit, wherein each of the one or more feed poppet valves is in direct flow communication with the feed inlet conduit and configured to control fluid flow along a flow path extending from a location external to the housing through the feed inlet conduit and to the adsorbent bed, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit; b) performing one or more purge steps, wherein each of the one or more purge steps comprise passing a purge stream into the adsorbent bed unit through one or more purge poppet valves and conducting away at least a portion of the one or more contaminants in a purge output stream via one or more purge output poppet valves; and c) repeating the steps a) to b) for at least one additional cycle, wherein the cycle duration is for a period greater than 1 second and less than 600 seconds, wherein at least one of the one or more feed poppet valves, one or more product poppet valves, one or more purge poppet valves or one and/or more purge output poppet valves has a valve cross sectional area disposed at least partially outside of an interface cross sectional area of the adsorbent bed. The present techniques may be further understood with reference to the FIGS. 1 to 5 below.

FIG. 1 is a three-dimensional diagram of a swing adsorption system 100 having six conventional adsorbent bed units and interconnecting piping. While this configuration is a specific example of a conventional skid, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 108, which are dedicated to the adsorbent bed unit and may be dedicated to one or more step in the swing adsorption process.

As an example, which is discussed further below, the adsorbent bed unit 102 may include a housing, which may include a head portion and other body portions, that forms a substantially gas impermeable partition, an adsorbent bed disposed within the housing and a plurality of valves providing fluid flow passages through openings in the housing between the interior region of the housing and locations external to the interior region of the housing. The adsorbent bed may include a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
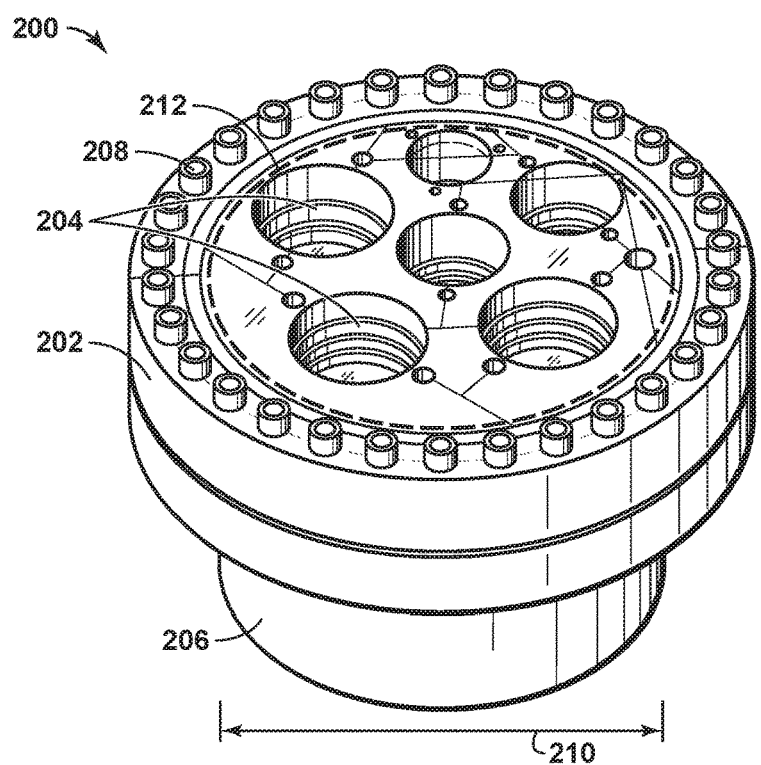
FIG. 2 is a schematic diagram of a partial view of a conventional adsorbent bed unit.

As a specific example, FIG. 2 illustrates a schematic diagram of a partial view of a conventional adsorbent bed unit 200. The adsorbent bed unit 200 includes a flat head 202 with valve bores or valve ports 204. The flat head 202 is connected to a flanged cylindrical unit or body 206 via bolts 208, which is truncated in this partial view. In this diagram, the valves (not shown) are disposed in the valve ports 204. These valve ports are within the interface cross section of the adsorbent bed, which is based on the diameter 210 and the perimeter 212.

As shown in this conventional adsorbent bed unit 200, the valves, which are disposed in the valve ports 204, are positioned directly above the adsorbent bed within the perimeter 212 (e.g., within the interface cross sectional area). However, for certain configurations, the footprint necessary for the valves to manage the flow of fluids to the adsorbent beds are larger than the footprint available above the adsorbent bed within the perimeter 212.

Figure 3:
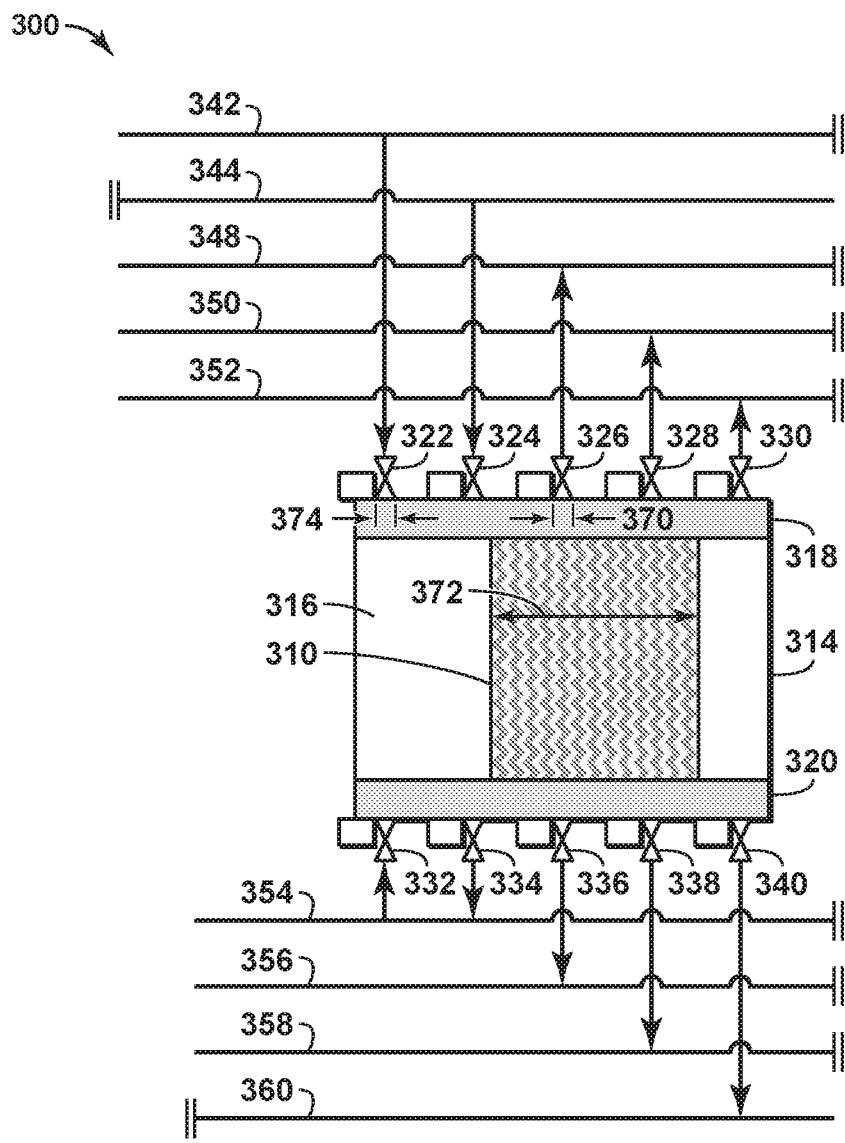
FIG. 3 is a diagram of a portion of an adsorbent bed unit having associated valve assemblies and manifolds in accordance with an embodiment of the present techniques.

The present techniques provide embodiments to overcome the limitations on the surface area available on the adsorbent bed unit. For example, FIG. 3 is a diagram 300 of a portion of an adsorbent bed unit having valve assemblies and manifolds in accordance with an embodiment of the present techniques. The portion of the adsorbent bed unit 300, which may be used in a configuration similar to FIG. 1, includes a housing or body, which may include a cylindrical wall 314 and cylindrical insulation layer 316 along with an upper head 318 and a lower head 320. An adsorbent bed 310 is disposed between an upper head 318 and a lower head 320 and the insulation layer 316, resulting in an upper open zone, and lower open zone, which open zones are comprised substantially of open flow path volume. Such open flow path volume in adsorbent bed unit contains gas that has to be managed for the various steps. The housing may be configured to maintain a pressure between 0.1 bara and 100 bara within the interior region.

The upper head 318 and lower head 320 contain openings in which valve structures can be inserted, such as valve assemblies 322 to 340, respectively (e.g., poppet valves). The upper or lower open flow path volume between the respective head 318 or 320 and adsorbent bed 310 can also contain flow distributors (not shown) which directly introduce fluids into the adsorbent bed 310 in a uniform manner. The flow distributor may include a perforated plate, circular plate or other device that distributes the flow over the adsorbent bed. The upper head 318 contains various openings (not show) to provide flow passages through the inlet manifolds 342 and 344 and the outlet manifolds 348, 350 and 352, while the lower head 320 contains various openings (not shown) to provide flow passages through the inlet manifold 354 and the outlet manifolds 356, 358 and 360. Disposed in fluid communication with the respective manifolds 342 to 360 are the valve assemblies 322 to 340. If the valve assemblies 322 to 340 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In this configuration, the interface is the end of the adsorbent bed 310 adjacent to the valves, such as valve assemblies 322 to 340. The interface cross sectional area is the cross sectional area of the adsorbent bed 310 at the respective ends. For this configuration, one or more valves are disposed at least partially outside of or beyond the interface cross sectional area, which is defined by the adsorbent bed 310. In particular, some of the valves are disposed in the respective head 318 and 320 to have a valve cross sectional area that is disposed along or at least partially outside of an outer perimeter of the adsorbent bed 310. For example, valves 322, 324 and 330 in head 318 along with valves 332, 334 and 340 in head 320 are disposed outside the interface cross sectional area of the adsorbent bed 310.

For areas outside the adsorbent bed 310, additional filler elements or structures may be used to lessen the dead volume. The filler structures may include filler material, channels and/or baffles, which may be utilized to manage the flow path and lessen the dead volume within the adsorbent bed unit. Also, the valves, such as valve assemblies 322 to 340, may be configured to operate (e.g., open or close) via a common actuation mechanism, such as a lift plate or other actuation mechanism, for different streams.

In this diagram 300, the valve cross sectional area for the valves is defined by the shape of the valve, such as valve 326, adjacent to the adsorbent bed 310, while the interface cross sectional area is defined by the shape of the adsorbent bed 310. As an example, if the valve 326 is a poppet valve having a circular disk element and the adsorbent bed 310 has the shape of a circular prism, the valve cross sectional area for the valve 326 is the area of the circle having a diameter 370, while the interface cross sectional area for the adsorbent bed 310 is the area of the circle having a diameter 372. Similarly, if the valve 322 is a poppet valve having a circular disk element, the valve cross sectional area for the valve 322 is the area of the circle having a diameter 374. In this configuration, the valves 322 and 326 are in direct flow communication with a conduit and configured to control fluid flow along a flow path extending from a location external to the housing through the conduit and to the adsorbent bed 310, wherein the valve 322 has a valve cross sectional area disposed at least partially outside of an interface cross sectional area of the adsorbent bed 310.

In swing adsorption processes, the cycle involves two or more steps that each has a certain time interval, which are summed together to be the cycle time. These steps include regeneration of the adsorbent bed following the adsorption step using a variety of methods including pressure swing, vacuum swing, temperature swing, purging (via any suitable type of purge fluid for the process), and combinations thereof. As an example, a swing adsorption cycle may include the steps of adsorption, depressurization, purging, and re-pressurization. When performing the separation at high pressure, depressurization and re-pressurization (which may be referred to as equalization steps) are performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Figure 4:
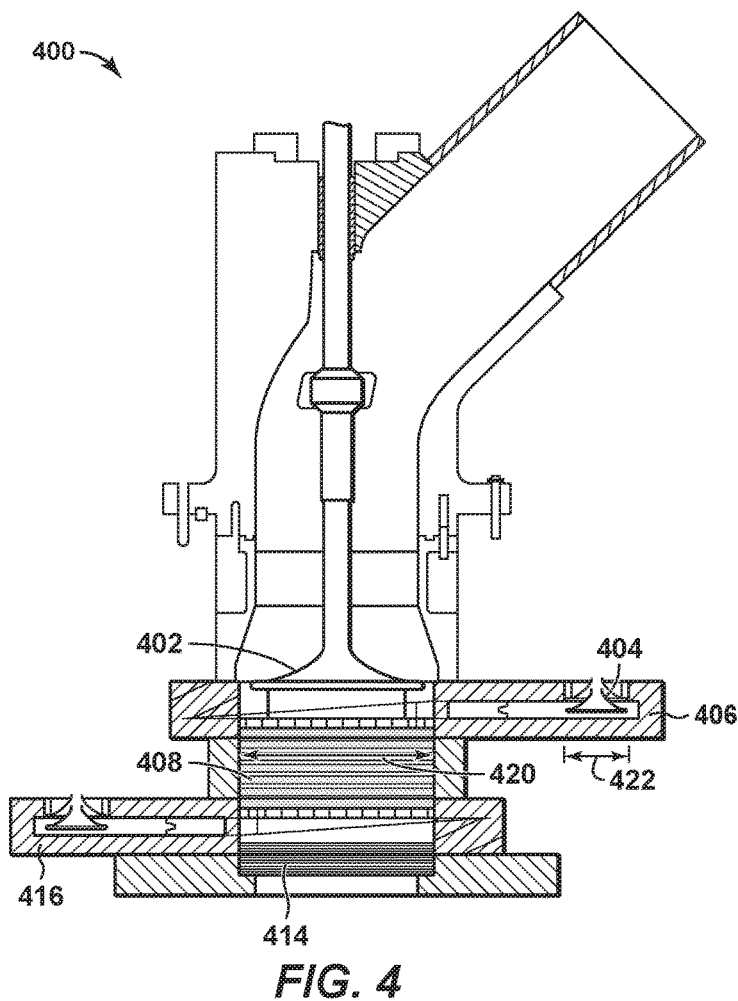
FIG. 4 is an exemplary diagram of a modified vertical cylindrical adsorbent bed unit in accordance with an embodiment of the present techniques.

A modified cylindrical adsorbent bed unit is shown in FIG. 4. For example, FIG. 4 is an exemplary diagram 400 of a modified cylindrical adsorbent bed unit in accordance with an embodiment of the present techniques. In this diagram 400, the primary valves, such as primary valve 402, on the adsorbent bed unit's head 406 are disposed within the perimeter of the adsorbent bed or interface cross sectional area of the adsorbent bed 408. Secondary valves, such as secondary valve 404, are disposed at least partially outside the perimeter or interface cross sectional area of the adsorbent bed 408 (e.g., at an outboard or outlying location). The secondary valve 404 may provide a flow path that is in fluid communication with a location external to the adsorbent bed unit to the adsorbent bed 408. This configuration provides flexibility in the valve location, such that more valves may be used than can be located directly on the head within the perimeter or interface cross sectional area of the adsorbent bed 408 (e.g., adsorbent bed unit's interior diameter). The outboard valve mounting location, such as the location of secondary valve 404, may be formed integrally with the adsorbent bed unit's head, or it may be formed in a separate plate that is disposed between the adsorbent bed unit's flange and the head 406.

FIG. 4 provides single valves in the onboard and outboard locations, but two or more valves can be used depending on the space needed for a specific application. Also, the valves may be actively-controlled valves as shown on the upper head 406, or passively-controlled valves, such as passively-controlled valve 414, as shown in the lower head 416 on FIG. 4. The axial length of the adsorbent bed unit may be changed to accommodate the adsorbent bed requirements.

In this diagram 400, the valve cross sectional area for the primary valve 402 is defined by the shape of the disk element of the primary valve 402, which is adjacent to the adsorbent bed 408, while the valve cross sectional area for the secondary valve 404 is defined by the shape of the disk element of the secondary valve 404 in the head 406. For example, if the disk elements of the primary valve 402 and the second valve 404 are circular, the valve cross sectional area for the primary valve 402 is the area of the circle having a diameter 420, while the valve cross sectional area for the secondary valve 404 is the area of the circle having a diameter 422.

Beneficially, the embodiment includes various enhancements. One enhancement is the ability to locate a larger number of valves than possible in the available space within the interface cross sectional area on the adsorbent bed unit's head directly above the adsorbent bed. Another enhancement is the ability to integrate a separate plate supporting the secondary flow valves with the adsorbent bed units that include a flathead configuration, such as shown in FIG. 2. In addition, another enhancement is the ability to support both actively-controlled and passively-controlled valves. Further, another enhancement is the ability to integrate with a variety of gas treating processes. In addition, this configuration does not significantly change the dead volume, as the flow passages are incremental increase in the dead volume.

Figure 5:
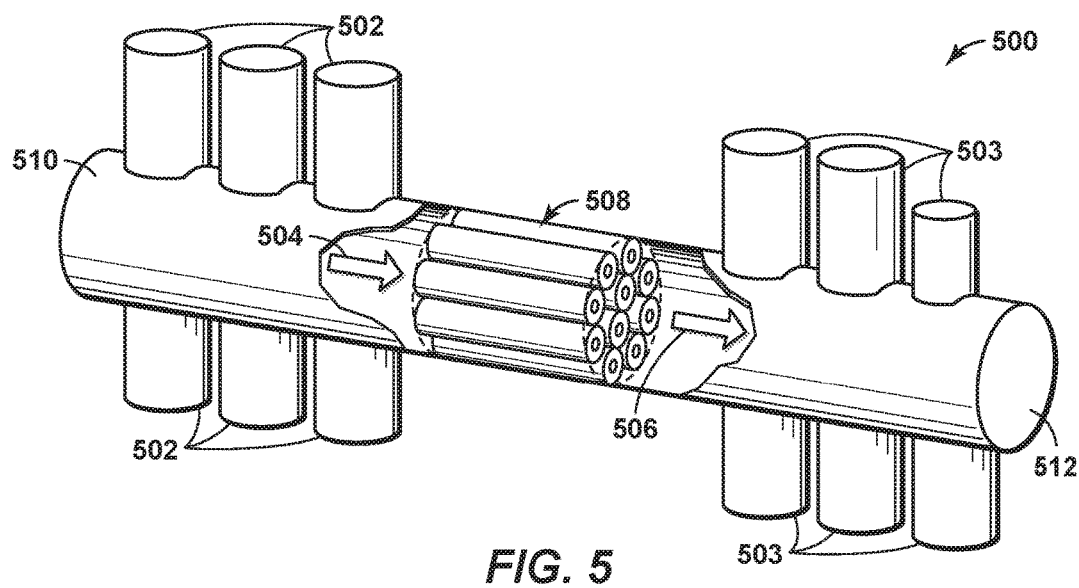
FIG. 5 is an exemplary diagram of an alternative horizontal adsorbent bed unit configuration in accordance with an embodiment of the present technique.

In yet another configuration, FIG. 5 is an exemplary diagram of an alternative adsorbent bed unit 500 configuration in accordance with an embodiment of the present technique. In this configuration, the direction of flow is axially along the length of the adsorbent bed unit, as shown by arrows 504 and 506, which may be in the opposite direction for different streams. A filler material may be used to accommodate a rectangular cross-sectional area for the adsorbent bed 508 within the interior diameter of the adsorbent bed unit. For example, if the interior diameter provides a circular area and the interface cross-sectional area of the adsorbent bed is a rectangular area.

Further, the valves, such as feed end valves 502 and product end valves 503, in the configuration are mounted along the ends, such as feed end 510 and product end 512, of the adsorbent bed unit 500 on either side of the adsorbent bed 508. Each of the valves, such as the feed end valves 502 and the product end valves 503, may be utilized for different streams and paired with another valve on the other end from the one the valve is disposed. For example, one of the feed end valves 502 and one of the product end valves 503 may be utilized to manage the feed stream and product stream, while one of the feed end valves 502 and one of the product end valves 503 may be utilized to manage the flow of the purge stream and the purge output stream.

In this configuration, the body portion at one or more of the ends of the adsorbent bed unit may have a larger diameter than the body portion that is adjacent to the adsorbent bed (e.g., the interface cross section area). For example, the feed end 510 and/or the product end 512 may have a larger inner diameter or cross sectional area for that body portion of the housing as compared to the inner diameter of the body portion adjacent to and surrounding the adsorbent bed. The larger inner diameter for the feed end 510 and/or the product end 512 may be used to facilitate the insertion and maintenance of the adsorbent bed 508 within the adsorbent bed unit.

For areas outside the adsorbent bed 500, additional filler structures may be used to lessen the dead volume. The filler structures may include filler material, channels and/or baffles, which may be utilized to manage the flow path around the filler material and lessen the dead volume within the adsorbent bed unit.

Similar to the configuration of FIG. 4, the configuration provides enhancements by decoupling the valve space from the cross sectional area of the adsorbent bed, such as the interface cross sectional area. For example, this configuration provides the ability to accommodate a large number of valves for varying services on a single adsorbent bed and removes the limitation imposed by the inner diameter of the adsorbent bed unit. As another enhancement, the configuration provides for removing limitations on the flow length, while providing superior flow distribution. Further, similar to the discussion above, the configuration provides enhancements in the access provided for repair and maintenance of bed internals. While this configuration may include additional dead volume as compared to the configuration of FIG. 4, this configuration may be useful for applications in which dead volume in the adsorbent bed unit is not restrictive or as limiting.

Further, in this configuration, the body portion at one or more of the ends of the adsorbent bed unit may have a smaller diameter than the body portion that is adjacent to the adsorbent bed (e.g., the interface cross section area). For example, the feed end 510 and/or the product end 512 may have a smaller inner diameter or cross sectional area for that body portion of the housing as compared to the inner diameter of the body portion adjacent to and surrounding the adsorbent bed. The smaller inner diameter for the feed end 510 and/or the product end 512 may be used to facilitate the insertion and maintenance of the adsorbent bed 508 within the adsorbent bed unit. Further, in such a configuration, one or more of the valves may have a valve cross sectional area disposed at least partially outside of an interface cross sectional area of the adsorbent bed. By way of example, if a flange was provided immediately adjacent to the end of the adsorbent bed 508, then the inner diameter of the feed end 510 or product end 512 may be smaller than the inside diameter of the section holding the aggregate of adsorbent bed 508. This configuration may lessen the dead volume in the respective ends.

As may be appreciated, the present techniques may be utilized to enhance swing adsorption processes. By way of example, a process for removing contaminants from a feed stream may include performing one or more adsorption steps and one or more purge steps. In performing one or more adsorption steps in an adsorbent bed unit, each of the adsorption steps may include (i) opening a plurality of feed poppet valves to pass a gaseous feed stream from a feed inlet conduit to an adsorbent bed disposed in an interior region of a housing of the adsorbent bed unit, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit. Each of the plurality of feed poppet valves may be in direct flow communication with the feed inlet conduit and may be configured to control fluid flow along a flow path extending from a location external to the housing through the feed inlet conduit and to the adsorbent bed. Further, at least one of the plurality of feed poppet valves have a valve cross sectional area disposed at least partially outside of an interface cross sectional area of the adsorbent bed. In addition, in performing one or more purge steps, each of the one or more purge steps may include passing a purge stream into the adsorbent bed unit to conduct away at least a portion of the one or more contaminants in a purge output stream. Then, the adsorption and purge steps may be repeated for at least one additional cycle, wherein the cycle duration is for a period greater than 1 second and less than 600 seconds.

Further, the process may include other enhancements. For example, the process may involve moving a common actuation mechanism to open the plurality of valves; passing the gaseous feed stream through a flow path around a filler material disposed adjacent to the adsorbent bed; distributing the gaseous feed stream to the adsorbent bed via a flow distributor disposed between the adsorbent bed and the plurality of feed poppet valves; and/or linearly moving with a feed actuating mechanism at least one feed valve stem to provide a feed opening between a feed disk element coupled to the at least one feed valve stem and a feed seat secured to the housing of the adsorbent bed unit. In addition, the process may include the cycle duration being for a period greater than 1 second and less than 90 seconds to separate one or more contaminants from the gaseous feed stream to form the product stream; providing a gaseous feed stream that is a hydrocarbon containing stream having greater than one volume percent hydrocarbons based on the total volume of the feed stream; and/or maintaining the feed pressure during the adsorption step in the range between 400 pounds per square inch absolute (psia) and 1,400 psia.

To manufacture systems and/or adsorbent bed units, various manufacturing techniques may be utilized. By way of example, the method of manufacturing a cyclical swing adsorbent bed unit may include: forming a housing having an interior region; disposing an adsorbent bed within the interior region of the housing; creating a plurality of valve ports into the housing; securing a valve to the housing in each of the plurality of valve ports to form a plurality of valves, wherein each of the plurality of valves is configured to control fluid flow along a flow path extending from a location external to the housing to the adsorbent bed, wherein at least one of the plurality of valves have a valve cross sectional area disposed at least partially outside of an interface cross sectional area of the adsorbent bed. As additional variations, the method may include: forming a head; creating the plurality of valve ports into the head; and securing the head to a body portion to form the housing. Also, the method may include forming a head; forming a plate; creating the plurality of valve ports into the plate; securing the plate adjacent to or between the head and a body portion, wherein the at least one of the plurality of valves have the valve cross sectional area disposed at least partially outside of the interface cross sectional area of the adsorbent bed is secured to the plate. Further, the method may include forming a head; forming a body portion; creating the plurality of valve ports into the body portion; securing the plurality of valve ports into the body portion; and securing the head to the body portion to form the housing. To form the body portion, the method may include forming a first body portion having a first inner diameter and forming a second body portion adjacent to the first body portion having a second inner diameter, wherein the second inner diameter is greater than the first inner diameter and the first body portion is adjacent to the adsorbent bed. Moreover, the method may include securing a common actuation mechanism to the plurality of valves, wherein the common actuation mechanism is configured to open or to close the plurality of valves; disposing a filler material adjacent to the adsorbent bed within the interior region, wherein the filler material is configured to lessen the dead volume within the interior region; and/or disposing a flow distributor between the adsorbent bed and the plurality of valves, wherein the flow distributor is configured to distribute fluids to the adsorbent bed.

In one or more embodiments, the material may include an adsorbent material supported on a non-adsorbent support. Non-limiting examples of adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups, which may be used for $CO_2$ removal, may include primary, secondary, tertiary and other non protogenic basic groups such as amidines, guanidines and biguanides.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a purge step, wherein the purge step reduces the pressure within the adsorbent bed unit and wherein the purge step involves passing a purge stream to a mid-purge distribution zone between first portion and the second portion; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

In yet another embodiment, a cyclical swing adsorbent bed unit for removing contaminants from a gaseous feed stream is described. The adsorbent bed unit comprising: a housing forming an interior region; an adsorbent bed disposed within the interior region; and a plurality of valves secured to the housing, wherein each of the plurality of valves is configured to control fluid flow along a flow path extending from a location external to the housing through a conduit and to the adsorbent bed, wherein a flow path through at least one of the plurality of valves is disposed, along a direction substantially perpendicular to the flow path, beyond outer edges of the adsorbent bed.

Further, the adsorbent bed units may include actively-controlled poppet valves and passively-controlled valves. The actively-controlled poppet valves, which may be referred to as actively-controlled poppet valve assemblies, may each include stem element secured to a disk element that is seatable within the head or a disk element that is seatable within a separate valve seat inserted within the head. The stem element may be connected to an actuating mechanism, such as electro-hydraulic or electro-pneumatic actuating mechanisms, which is configured to have the respective valve impart linear motion to the respective stem element. As may be appreciated, the actuating mechanism may be operated independently for different steps in the process to activate a single valve or a single actuating mechanism may be utilized to control two or more valves. As an example, opening an actively-controlled poppet valve may include linearly moving with a actuating mechanism at least one valve stem to provide an opening between a disk element coupled to the at least one valve stem and a seat secured to the housing of the adsorbent bed unit. As another example, opening actively-controlled poppet valves may include linearly moving a lift plate secured to the valve stems with an actuating mechanism to provide openings, wherein each of the valve stems is secured to a disk element and each of the openings forms a gap or flow path between the disk element and an associated seat secured to the housing of the adsorbent bed unit.

The passively-controlled valve may include passively-controlled poppet valves, passively-controlled check valves, passively-controlled reed valves, and the other suitable passively-controlled valves. For example, the passively-controlled poppet valves, which may be referred to as passively-controlled poppet valve assemblies, may each include stem element secured to a disk element that is seatable within the head or a disk element that is seatable within a separate valve seat inserted within the head. The stem element may be connected to a biasing mechanism, such as a spring or other biasing mechanisms, which is configured to have the respective valve impart linear motion to the respective stem element. As may be appreciated, the biasing mechanism may be operated independently for different steps in the process and may be activated based on a pressure differential to activate a single valve or two or more valves. One configuration of a passively-controlled poppet valve may include a spring-loaded passively-controlled poppet valve. In this spring-loaded configuration, the disk element may be an integral component with a hollow stem element, which has the springs disposed at least partially within the hollow stem element. As an example, the opening of passively-controlled poppet valves may include linearly moving with a product biasing mechanism at least one product valve stem to provide a product opening between a product disk element coupled to the at least one product valve stem and a product seat secured to the housing of the adsorbent bed unit. The product biasing mechanism may be configured to move linearly based on a pressure differential between the interior region and the product conduit exceeding a specific threshold. In other configurations, the linear movement based on the pressure differential may be different for various valves operating in phase. For example, the passively-controlled valves operating in phase may involve a range or a differential window of less than 25%, less than 20% or less than 10% (e.g., differential window may be calculated as the highest pressure differential minus the lowest pressure differential with that difference being divided by the highest pressure differential). As another example, a passively-controlled valve may also be configured as a reed-valve comprised of a flexible strip of metal or composite material anchored on one end and bending to open the passively controlled flow area. The passively-controlled reed valve may be utilized to provide more flow at a given differential pressure in a given footprint.

In certain embodiments, a swing adsorption system may be used for removing contaminants from a feed stream. By way of example, the contaminants may include $CO_2$. Accordingly, the system and process may be used to lower the $CO_2$ levels in the feed stream to below a predefined specifications in the product stream (e.g., less than or equal to 50 parts per million volume (ppmv) $CO_2$). As another example, the contaminants may include $H_2O$. The system and process may be used to lower the $H_2O$ levels in the feed stream to below a predefined specifications in the product stream (e.g., less than 150 ppmv of $H_2O$, less than 105 ppmv of $H_2O$, less than 30 ppmv of $H_2O$, less than 10 ppmv of $H_2O$, less than 1 ppmv of $H_2O$ or less than 0.1 ppmv of $H_2O$).

In one or more embodiments, the rapid cycle swing adsorption process in the present techniques is a rapid cycle temperature swing adsorption (RCTSA) and a pressure swing adsorption (PSA). For example, the total cycle times may be greater than 1 second, or greater than 2 seconds; and may be less than 600 seconds, may be less than 300 seconds, preferably less than 200 seconds, more preferably less than 100 seconds, may be less than 90 seconds, or even more preferably less than 60 seconds. By way of example, the cycle duration may be for a period greater than 1 second and less than 600 seconds, the cycle duration is for a period greater than 1 second and less than 300 seconds, or the cycle duration is for a period greater than 1 second and less than 200 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorbent bed unit for removing contaminants from a gaseous feed stream,
the adsorbent bed unit comprising:
  a housing forming an interior region;
  an adsorbent bed disposed within the interior region;
  a plurality of valves secured to the housing, wherein each of the plurality of valves is configured to control fluid flow along a flow path extending from a location external to the housing through a conduit and to the adsorbent bed, wherein at least one of the plurality of valves has a valve cross sectional area disposed at least partially outside of an interface cross sectional area of the adsorbent bed; and
  a filler material disposed adjacent to the adsorbent bed and configured to lessen the dead volume within the interior region, wherein the filler material is disposed between an interior diameter of the housing of the adsorbent bed and the adsorbent bed unit is configured such that the flow path is around the filler material;
  wherein the cyclical swing adsorbent bed unit is configured to operate on a cycle duration period greater than 1 second and less than 600 seconds.

2. The cyclical swing adsorbent bed unit of claim 1, wherein the housing comprises a head coupled to a body portion to form the housing; and the plurality of valves are secured to the head.

3. The cyclical swing adsorbent bed unit of claim 1, wherein the housing comprises:
  a head coupled to a body portion to form the housing; wherein one or more of the plurality of valves are secured to the head; and
  a plate adjacent to the head, wherein the at least one of the plurality of valves is secured to the plate.

4. The cyclical swing adsorbent bed unit of claim 1, wherein the housing comprises a head engaged with a body portion; and the plurality of valves are secured to the body portion.

5. The cyclical swing adsorbent bed unit of claim 2, wherein the body portion comprises a first body portion surrounding the adsorbent bed having a first inner diameter and a second body portion adjacent to the first body portion having a second inner diameter, wherein the second inner diameter is greater than the first inner diameter.

6. The cyclical swing adsorbent bed unit of claim 1, wherein the at least one of the plurality of valves has a valve cross sectional area disposed outside of an interface cross sectional area of the adsorbent bed.

7. The cyclical swing adsorbent bed unit of claim 1, wherein the plurality of valves are operated via common actuation mechanism.

8. The cyclical swing adsorbent bed unit of claim 1, wherein the adsorbent bed unit further comprises a flow distributor disposed between the adsorbent bed and the plurality of valves.

9. The cyclical swing adsorbent bed unit of claim 1, wherein the housing is configured to maintain a pressure from 5 pounds per square inch absolute (psia) and 1,400 psia.

10. A process for removing contaminants from a feed stream, the process comprising:
  a) performing one or more adsorption steps in an adsorbent bed unit, wherein each of the one or more adsorption steps comprise: (i) opening a plurality of feed poppet valves to pass a gaseous feed stream from a feed inlet conduit to an adsorbent bed disposed in an interior region of a housing of the adsorbent bed unit, wherein each of the plurality of feed poppet valves is in direct flow communication with the feed inlet conduit and configured to control fluid flow along a flow path extending from a location external to the housing through the feed inlet conduit and to the adsorbent bed, wherein at least one of the plurality of feed poppet valves has a valve cross sectional area disposed at least partially outside of an interface cross sectional area of the adsorbent bed, and wherein a filler material is disposed adjacent to the adsorbent bed in the interior region of the housing of the adsorbent bed unit, and the filler material is configured to lessen the dead volume within the interior region of the housing of the adsorbent bed unit, and wherein the filler material is disposed between an interior diameter of the housing of the adsorbent bed unit and configured such that the flow path is around the filler material, (ii) exposing the gaseous feed stream to the adsorbent bed through the flow path around the filler material to separate one or more contaminants from the gaseous feed stream to form a product stream, and (iii) opening one or more product poppet valves to conduct away the product stream from the interior region in the housing to a product conduit;

b) performing one or more purge steps, wherein each of the one or more purge steps comprise passing a purge stream into the adsorbent bed unit to conduct away at least a portion of the one or more contaminants in a purge output stream; and c) repeating the steps a) to b) for at least one additional cycle, wherein the cycle duration is for a period greater than 1 second and less than 600 seconds.

11. The process of claim 10, wherein the opening the plurality of feed poppet valves further comprises moving a common actuation mechanism to open the plurality of valves.

12. The process of claim 10, wherein the opening the plurality of feed poppet valves further comprises distributing the gaseous feed stream to the adsorbent bed via a flow distributor disposed between the adsorbent bed and the plurality of feed poppet valves.

13. The process of claim 10, wherein opening the plurality of feed poppet valves further comprise linearly moving with a feed actuating mechanism at least one feed valve stem to provide a feed opening between a feed disk element coupled to the at least one feed valve stem and a feed seat secured to the housing of the adsorbent bed unit.

14. The process of claim 10, wherein the cycle duration is for a period greater than 1 second and less than 300 seconds to separate one or more contaminants from the gaseous feed stream to form the product stream.

15. The process of claim 10, wherein the gaseous feed stream is a hydrocarbon containing stream having greater than one volume percent hydrocarbons based on the total volume of the gaseous feed stream.

16. The process of claim 10, wherein a feed pressure of the gaseous feed stream is in the range between 400 pounds per square inch absolute (psia) and 1,400 psia.

17. The process of claim 10, wherein performing the one or more adsorption steps is configured to lower the carbon dioxide ($CO_2$) level to less than 50 parts per million volume.

18. The process of claim 10, wherein performing the one or more adsorption steps is configured to lower the water ($H_2O$) level to less than 105 parts per million volume.

19. A method of manufacturing a cyclical swing adsorbent bed unit, the method comprising:
forming a housing having an interior region;
disposing an adsorbent bed within the interior region of the housing;
disposing a filler material adjacent to the adsorbent bed and configured to lessen the dead volume within the interior region of the housing, wherein the filler material is disposed between an interior diameter of the housing the adsorbent bed and the adsorbent bed unit is configured such that a flow path of a fluid flow is around the filler material;
creating a plurality of valve ports into the housing;
securing a valve to the housing in each of the plurality of valve ports to form a plurality of valves, wherein each of the plurality of valves is configured to control the fluid flow along the flow path extending from a location external to the housing to the adsorbent bed, wherein at least one of the plurality of valves have a valve cross sectional area disposed at least partially outside of an interface cross sectional area of the adsorbent bed.

20. The method of claim 19, wherein the creating the plurality of valve ports into the housing comprises:
forming a head;
creating the plurality of valve ports into the head; and
securing the head to a body portion to form the housing.

21. The method of claim 19, further comprising:
forming a head; and
forming a plate;
creating the plurality of valve ports into the plate;
securing the plate adjacent to the head and a body portion to form the housing, wherein the at least one of the plurality of valves have the valve cross sectional area disposed at least partially outside of the interface cross sectional area of the adsorbent bed is secured to the plate.

22. The method of claim 19, wherein the creating the plurality of valve ports into the housing comprises:
forming a head;
forming a body portion;
creating the plurality of valve ports into the body portion;
securing the plurality of valve ports into the body portion; and
securing the head to the body portion to form the housing.

23. The method of claim 22, wherein the forming the body portion comprises forming a first body portion having a first inner diameter and forming a second body portion adjacent to the first body portion having a second inner diameter, wherein the second inner diameter is greater than the first inner diameter and the first body portion is adjacent to the adsorbent bed.

24. The method of claim 22, wherein the forming the body portion comprises forming a first body portion having a first inner diameter and forming a second body portion adjacent to the first body portion having a second inner diameter, wherein the second inner diameter is smaller than the first inner diameter and the first body portion is adjacent to the adsorbent bed.

25. The method of claim 19, further comprising securing a common actuation mechanism to the plurality of valves, wherein the common actuation mechanism is configured to open or to close the plurality of valves.

26. The method of claim 19, further comprising disposing a flow distributor between the adsorbent bed and the plurality of valves, wherein the flow distributor is configured to distribute fluids to the adsorbent bed.

27. A process for removing contaminants from a feed stream, the process comprising:
a) performing one or more adsorption steps in an adsorbent bed unit, wherein each of the one or more adsorption steps comprise: (i) opening one or more feed poppet valves to pass a gaseous feed stream from a feed inlet conduit to an adsorbent bed disposed in an interior region of a housing of the adsorbent bed unit, wherein each of the one or more feed poppet valves is in direct flow communication with the feed inlet conduit and configured to control fluid flow along a flow path extending from a location external to the housing through the feed inlet conduit and to the adsorbent bed, wherein a filler material is disposed adjacent to the adsorbent bed in the interior region of the housing of the adsorbent bed unit, and the filler material is configured to lessen the dead volume within the interior region of the housing of the adsorbent bed unit, and wherein the filler material is disposed between an interior diameter of the housing of the adsorbent bed unit and configured such that the flow path is around the filler material, (ii) exposing the gaseous feed stream to the adsorbent bed to separate one or more contaminants from the gaseous feed stream to form a product stream, and (iii) opening one or more product poppet valves to conduct away the product stream from the interior region in the housing to a product conduit;

b) performing one or more purge steps, wherein each of the one or more purge steps comprise passing a purge stream into the adsorbent bed unit through one or more purge poppet valves and conducting away at least a portion of the one or more contaminants in a purge output stream via one or more purge output poppet valves; and c) repeating the steps a) to b) for at least one additional cycle, wherein the cycle duration is for a period greater than 1 second and less than 600 seconds, wherein at least one of the one or more feed poppet valves, one or more product poppet valves, one or more purge poppet valves or one or more purge output poppet valves has a valve cross sectional area disposed at least partially outside of an interface cross sectional area of the adsorbent bed.

28. The process of claim 27, wherein the opening the plurality of feed poppet valves further comprises moving a common actuation mechanism to open the plurality of valves.

29. The process of claim 27, wherein the opening the plurality of feed poppet valves further comprises distributing the gaseous feed stream to the adsorbent bed via a flow distributor disposed between the adsorbent bed and the plurality of feed poppet valves.

30. The process of claim 27, wherein opening the plurality of feed poppet valves further comprise linearly moving with a feed actuating mechanism at least one feed valve stem to provide a feed opening between a feed disk element coupled to the at least one feed valve stem and a feed seat secured to the housing of the adsorbent bed unit.

31. The process of claim 27, wherein the cycle duration is for a period greater than 1 second and less than 300 seconds to separate one or more contaminants from the gaseous feed stream to form the product stream.

32. The process of claim 27, wherein the gaseous feed stream is a hydrocarbon containing stream having greater than one volume percent hydrocarbons based on the total volume of the gaseous feed stream.

33. The process of claim 27, wherein a feed pressure of the gaseous feed stream is in the range between 400 pounds per square inch absolute (psia) and 1,400 psia.

* * * * *